United States Patent [19]

Murtha

[11] Patent Number: 4,519,384
[45] Date of Patent: May 28, 1985

[54] CONCENTRATING SOLAR BEAM COLLECTOR

[76] Inventor: R. Michael Murtha, 10965 Del Norte #210, Ventura, Calif. 93004

[21] Appl. No.: 609,701

[22] Filed: May 14, 1984

[51] Int. Cl.³ ............................................. F24J 3/02
[52] U.S. Cl. .................................. 126/438; 126/451; 136/246
[58] Field of Search ................. 126/438, 451; 136/246

[56] References Cited

U.S. PATENT DOCUMENTS

| 1,951,404 | 3/1934 | Goddard | 126/438 |
| 2,945,417 | 7/1960 | Caryl et al. | 126/451 |
| 4,281,640 | 8/1981 | Wells | 126/439 |

Primary Examiner—Carroll B. Dority, Jr.
Attorney, Agent, or Firm—Jack C. Munro

[57] ABSTRACT

A solar heat collector which is constructed of a frame upon which are mounted a plurality of separate louvered panels. With the panels being mounted on the frame, the collector assumes a basic elliptical shape in transverse cross-section forming an interior closed area. The upper surface of this area (nearest the sun) is formed of two separate identical panels which are positioned in a substantially edge-abutting reversed relationship. The lower surface of the enclosed area (furthest from the sun) is also formed of two separate identical panels which are also located in an edge-abutting reversed relationship. Construction of the lower surface panels is different than the construction of the upper surface panels with the louvers being pitched at different angles. Within the enclosed area there is to be located an energy converting device assembly which can either take a form of a photovoltaic cell assembly or a heat pipe assembly.

9 Claims, 4 Drawing Figures

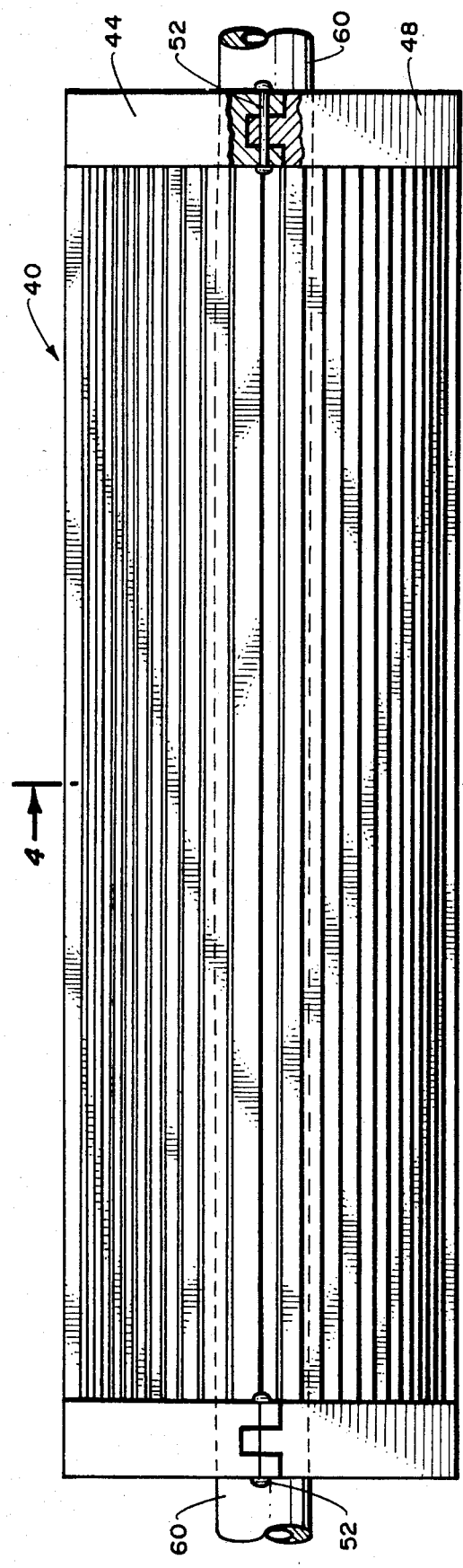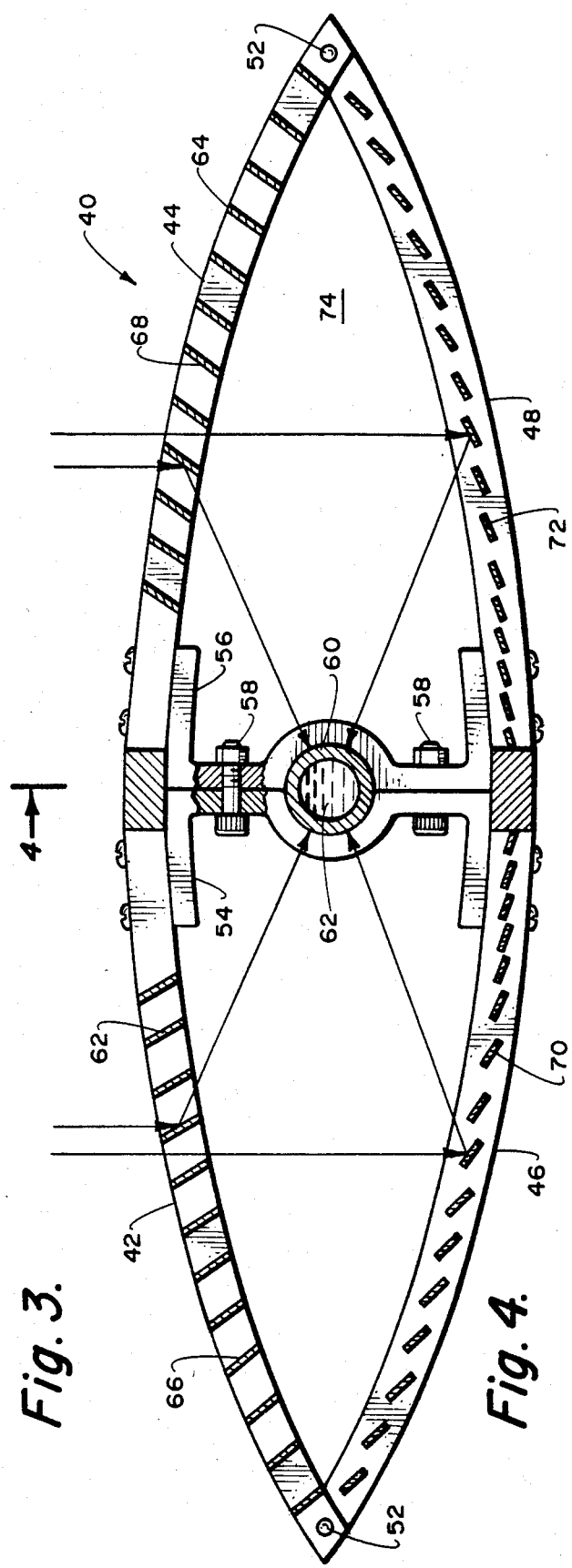

CONCENTRATING SOLAR BEAM COLLECTOR

BACKGROUND OF THE INVENTION

The field of this invention relates to an energy producing apparatus and more particularly to an apparatus which is to extract energy from the sun through the use of either a heat pipe or a photovoltaic cell assembly.

It is well-known that the earth receives an enormous amount of radiant energy from the sun. Concern about the dwindling supply of fossil fuels, and about the problems that accompany nuclear power, had led to a rapidly growing interest in the possible ways of harvesting solar energy in ways useful to man. One use of this energy, that is highly promising, is the direct conversion of the solar insolation into direct current electricity. Photovoltaic solar cells accomplish this task with no pollution or significant safety risk. In addition, the electrical output of a silicon solar cell can be increased if the cell is made to face, or track, the sun throughout the day and year. Its electrical output is further improved if sunlight is optically concentrated onto its flat surface. Solar cells are expensive to make and so anything that serves to extract more electricity from a cell will tend to reduce the cost of the cell and the total area of cells needed. Because of the additional electrical output, tracking equipment and concentrator modules more than pay for themselves in this arrangement.

Concentrator modules are usually the next most expensive component in a photovoltaic array. If their performance can be improved and if the manufacturing costs can be brought down, then the cost to the consumer of a "peak watt" is reduced.

Focal line reflecting concentrators of the prior art are expensive and tend to keep the price of solar electricity high. Older concentrators also tend to "wind load" and therefor de-focus during turbulent weather conditions.

SUMMARY OF THE INVENTION

The collector of this invention is designed to be utilized with either a photovoltaic cell string assembly, which converts solar energy directly into electricity, or a heat pipe within which is conducted a liquid which can be turned to steam by the solar energy. The collector of this invention is designed to be formed as an elongated unit which in transverse cross-section is basically in the shape of an ellipse with the area of the ends of the major axis of the ellipse being flattened. The collector is to be mounted in such a manner as to orient the upper surface of the ellipse directly toward the sun. This upper surface of the ellipse is formed of two identical panels which are located in a substantially edge-abutting reversed relationship. These panels are mounted on the frame of the collector. Each of these panels is constructed to include a series of louvers. The sun rays are to pass through the openings provided by the louvers and actually are to be reflected by a highly reflective surface of the louvers to within the interior enclosed space of the elliptical shaped collector. Each louver causes a linear path of light to be directed onto an energy converting device which is mounted on the frame of the collector and located within the interior enclosed space of the collector. Each panel is basically constructed of a sheet material planar configuration. However, upon mounting of each panel onto the frame of the collector, the panel assumes a basically arcuate configuration. The position of each louver within each panel is oriented precisely so that when in this arcuate configuration each louver will reflect its linear path of light directly onto the energy converting device resulting in a stacked series of linear paths of light being applied to the energy converting device. The lower surface of the collector is also formed of a pair of panels similar to the aforementioned panels and mounted in a similar manner on the frame of the collector. However, the louver construction within these panels is different than the louver construction of the first mentioned panels. It is the function of the lower panels to reflect light rays which pass through the openings provided in the upper panels and was not reflected by the louvers of the upper panels. The light reflected from the lower panels is also directed onto the energy converting device in a similarly stacked arrangement. The energy converting device can take the form of either a single heat pipe assembly, or can take the form of a plurality of photovoltaic cell assemblies. Each photovoltaic cell assembly would be elongated with there being a single photovoltaic cell assembly located directly at each flattened end of the elliptical shape collector.

The primary objective of the present invention is to construct an efficient solar beam collector which concentrates the solar energy onto an energy converting device to therefore maximize the efficiency of the receiver.

Another objective of this invention is to construct the collector of easily manufactured parts which can be assembled together in a non-complex arrangement, therefore, minimizing manufacturing expense of the collector.

Another objective of this invention is to construct the collector so that it can be easily and quickly maintained over an extended length of time.

Yet another objective of this invention is to construct a balanced collector with reflecting surfaces that tend to dissipate heat and to neutralize the effects of wind.

BRIEF DESCRIPTION OF THE DRAWINGS

FIG. 3 is a side elevational view of the second embodiment of the collector of this invention; and FIG. 4 is a cross-sectional view taken along line 4—4 of FIG. 3.

DETAILED DESCRIPTION OF THE SHOWN EMBODIMENT

Figure 1:
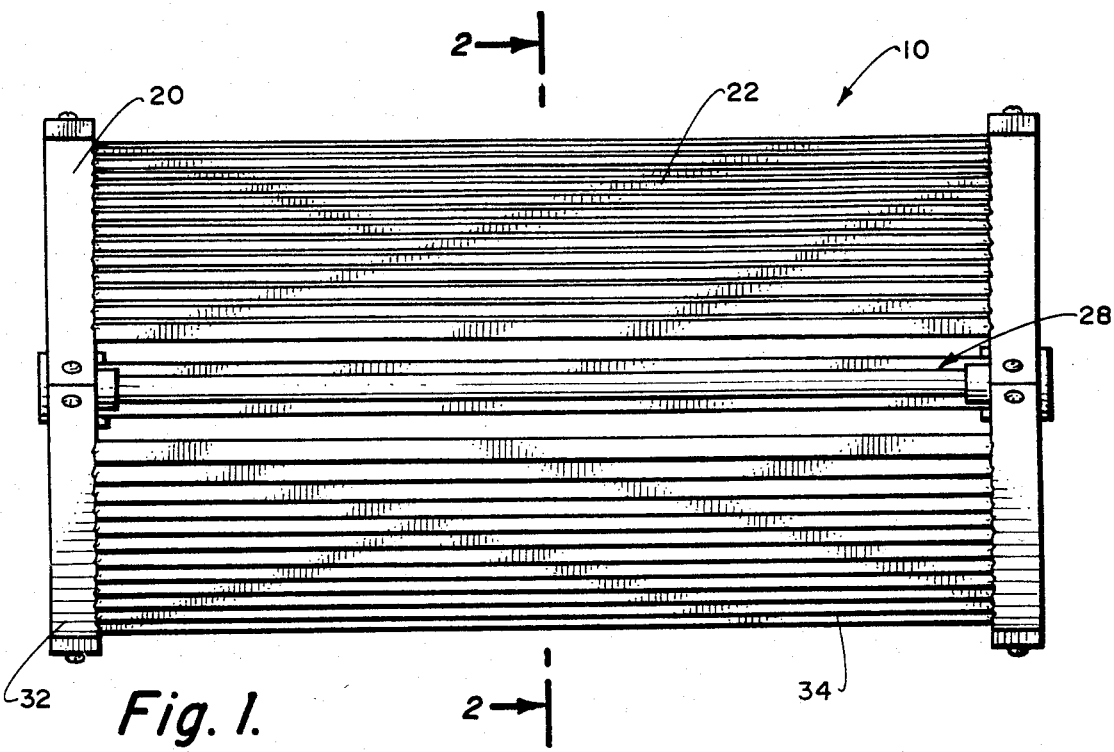
FIG. 1 is a side elevational view of a selected longitudinal length of a collector of this invention.
Figure 2:
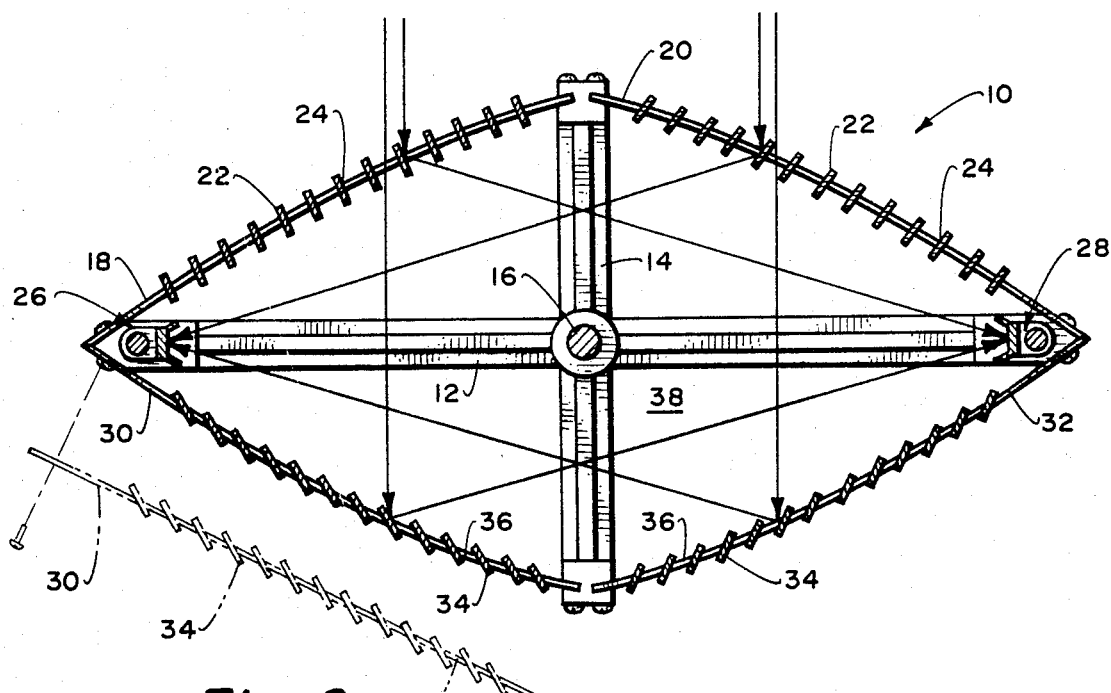
FIG. 2 is a cross-sectional view taken along line 2—2 of FIG. 1.

Referring particularly to FIGS. 1 and 2 of the drawings, there is shown the first embodiment of collector 10 of this invention which is shown basically as a single elongated unit. It is to be understood that normally a mass of the units will be connected together within the particular installation. It is sufficient for this invention to describe a single unit, it being understood that similar such units would be connected together and would operate as an overall assembly.

Each unit 10 includes a frame which is composed of horizontal supporting members 12 and vertical supporting members 14. The members 12 and 14 are fixed to a rod 16 with the members 12 and 14 located in a crossed pattern. The members 12 and 14 will normally be of a metal material. However, any rigid material could be utilized. It is to be understood that there is a pair of members 12 and 14 at one end of the collector 10 with another pair of similar members 12 and 14 located at the opposite end of the collector 10.

The collector 10 is to be mounted by means of the rod 16 on a supporting structure not shown. The entire collector 10 is to be pivotable with respect to the supporting structure by means of the rod 16. The purpose of the pivoting motion is to directly face the upper surface of the collector 10 at the sun. The upper surface of the collector 10 comprises sheet material panels 18 and 20. Each of the panels 18 and 20 are identical but are located in an edge-abutting reversed relationship.

Each of panels 18 and 20 include a series of louvers 22. Between each directly adjacent pair of louvers 22 is an elongated slot 24. The louvers 22 extend substantially the entire length of the panels 18 with the exception of the portion of each panel 18 that is located directly adjacent each of the ends of the collector 10.

Mounted between the members 12 at one end thereof, is a first photovoltaic cell assembly 26. A second photovoltaic cell assembly 28 is similarly mounted between the opposite end of the members 12.

The under surface of the collector 10 is formed by means of panels 30 and 32. Panels 30 and 32 are also identical and are similarly located in a substantially edge-abutting reversed relationship. Panels 30 and 32 each include a series of louvers 34. Between each directly adjacent pair of louvers 34 there is located an opening 36. As shown in FIG. 2, all of the louvers 34 are similarly inclined when the panel is flat. The same is true for the upper panels though the louvers 22 are inclined at a different common angle when panels 18 and 20 are flat.

In the preferred embodiment it is envisioned that the reflective panels are manufactured of prefinished aluminum sheet or the equivalent thereof. The louvers can be formed by a well-known pressing process, then the whole panel anodized clear. One end of the panel 18 is fixedly mounted by fastening means to the outer free end of the spaced-apart members 12. The opposite edge of the panel 18 is then attached to the upper end of the members 14. However, to do so, the panel 18 must be physically bent for this edge to contact the upper end of the members 14. This bending is important as it then causes panel 18 to assume a slightly arcuate configuration. It is found that the preferable amount of curving of the panel 18 would be a shallow segment of a circle that can hold its profile configuration under all conditions of tracking and weather.

The surfaces of the louvers 22 are to be highly reflective. This bowing of the panel 18 causes the louvers to change pitch such that light that is reflected from one louver is not interferred by an adjacent louver. These resulting widths of sunlight are stacked upon the cell 28. This is important since the strongest voltage obtained from the cell assembly 28 is directly in relationship to the weakest light concentration that the cell assembly 28 is being subjected thereto. Therefore, the stacking of predefined widths insures the greatest amount of uniformity of light to eliminate creating of an area of weak light concentration. The concentration of about fifty suns per photovoltaic assembly is considered within the capability of the present invention.

It is to be noted that the bowing of the panel 18 has been preselected so that each of the louvers 22 will direct a strip of light centrally onto the photovoltaic cell assembly 28. The light rays that pass through the openings 24 are then caused to come into contact with the inner reflective surface of each of the louvers 34. These surfaces of the louvers 34 then cause the light to be reflected also onto the photovoltaic cell assembly 28. Again, installing of the panel 30 between the members 12 and the members 14 is such that the panel 30 is to be bowed assuming a similar arcuate configuration to that of panel 18. As a result, the reflective face of each of the louvers 34 is inclined such that strips of light are to be reflected and stacked upon the photovoltaic cell assembly 28.

In a similar manner, the light rays that contact the reflective face of the louvers 22 is transmitted onto and stacked upon the photovoltaic cell assembly 26. The light that passes through the openings 24 and comes into contact with the louvers 34 is then reflected and also stacked upon the photovoltaic cell assembly 26. The panels 18, 20, 30 and 32 form an enclosed area 38. The photovoltaic cell assemblies 26 and 28 are located within this enclosed area 38.

It is to be understood that the collector 10 of this invention will be pivotly mounted in such a manner so the collector 10 will "follow the sun" so that the light rays (beam) will contact collector 10 directly such as shown within FIG. 2 of the drawings.

Referring particularly to FIGS. 3 and 4 of the drawings, there is shown a second embodiment 40 a collector of this invention. The embodiment 40 is manufactured in a similar manner of identical panels 42 and 44 and a second set of identical panels 46 and 48. The panels 42 and 44 are to be located along the upper surface of the collector with the panels 46 and 48 located at the bottom surface of the collector. Panels 42, 44, 46 and 48 are formed as rigid units (not bendable). The outer free ends of the panels 42 and 46 are connected together by means of a pin 50. The outer end of the panels 44 and 48 are similarly connected together by means of a pin 52. It is to be understood that there is a separate pin 52 located at each longitudinal end of the panels 44 and 48. Similarly there will be two separate pins 50.

The inner end of the panels 42 and 46 are fixedly mounted onto a first mounting bracket 54. Again, it is to be understood that there are two separate mounting brackets 54 located at each end of the panels 42 and 46. In a similar manner the inner ends of the panels 44 and 48 are fixedly mounted onto a second mounting bracket 56. It is again to be understood that there will be a single mounting bracket 56 located at each end of the panels 44 and 48. The mounting brackets 54 and 56 are to be bolted together by means of fasteners 58. Each of the mounting brackets 54 and 56 includes a semicircular section which will operate together about a heat pipe 60. Within the heat pipe 60 is to be located a liquid 62.

It is to be noted that the basic overall configuration in transverse cross-section of the embodiment 40 is that of a basic ellipse having flattened ends. This same shape is apparent in the first embodiment 10 of this invention as shown in FIG. 2 of the drawings.

The light rays that are conducted onto the upper surface of the collector 40 of this invention, which comprises panels 42 and 44, is to come into contact with the reflective surface of louvers 62 and 64 respectively. The positioning of the louvers 62 and 64 is such that the light rays are reflected directly onto the heat pipe 60. The light rays that pass through the openings 66, which are located between directly adjacent louvers 62, and also pass through openings 68 located between directly adjacent louvers 64, are caused to come into contact respectively with the louvers 70 and 72 of the respective panels 46 and 48. The position of the louvers 70 and 72 are such that these light rays are reflected directly onto the heat pipe 60. The width of the louvers 70 and 72 is such that they are to pick up all the light that passes through the openings 66 and 68. The heated liquid 62 within the heat pipe 60 is then utilized to perform work in some desired manner.

It is to be noted that similarly the panels 42, 44, 46 and 48 connect together to form an enclosed area 74.

What is claimed is:

1. A concentrating solar beam collector comprising: a frame;
a louvered panel assembly including a louvered panel forming an upper surface and a louvered panel forming an under surface mounted on said frame and defining an interior enclosed area, said louvered panels including a plurality of spaced louvers having light reflective surfaces; and
an energy converting device mounted on said frame, said energy converting device being located within said enclosed area, said louvered panels being situated so that some light rays are reflected from the surface of said louvers of the upper surface of the energy converting device while other light rays pass between the spacing of the louvers forming the upper surface and are reflected by the louvers forming the under surface of the energy converting device.

2. The collector as defined in claim 1 wherein:
said louvered panel assembly comprising a plurality of separate panels, at least two in number of said panels being identical.

3. The collector as defined in claim 2 wherein:
said two in number of identical panels being located in a substantially edge-abutting reversed relationship.

4. The collector as defined in claim 3 wherein:
each said panel being flexible so as to be bendable from its basically planar manufacturing shape to assume a arcuate configuration when mounted on said frame.

5. The collector as defined in claim 4 wherein:
the shape in transverse cross-section of said louvered panel assembly when mounted on said frame being substantially that of an ellipse, said ellipse having flattened ends along the major axis thereof.

6. The collector as defined in claim 5 wherein:
said energy converting device comprises two separate spaced-apart energy converting devices, a said energy converting device located at each said flattened end.

7. The collector as defined in claim 6 wherein:
each said energy converting device comprising a photovoltaic cell assembly.

8. The collector as defined in claim 5 wherein:
said energy converting device being centrally located within said interior closed area.

9. The collector as defined in claim 8 wherein:
said energy converting device comprising a heat pipe.

* * * * *